United States Patent [19]

Liechty

[11] Patent Number: 5,072,505
[45] Date of Patent: Dec. 17, 1991

[54] METHOD FOR ASSEMBLING A RETAINER RING ONTO AN ARTICLE

[75] Inventor: Deryll Liechty, Berne, Ind.

[73] Assignee: Micro-Precision Operations, Inc., Berne, Ind.

[21] Appl. No.: 594,749

[22] Filed: Oct. 9, 1990

Related U.S. Application Data

[60] Division of Ser. No. 337,895, Apr. 14, 1989, Pat. No. 4,982,484, which is a continuation-in-part of Ser. No. 600,237, Apr. 16, 1984, abandoned, which is a division of Ser. No. 362,203, Mar. 26, 1982, Pat. No. 4,454,642.

[51] Int. Cl.⁵ ............................................. B23P 11/02
[52] U.S. Cl. ....................................... 29/450; 29/453
[58] Field of Search ............ 29/225, 229, 235, 243.56, 29/283, 222, 888.011, 888.06, 172, 173, 450, 453, 418, 433; 403/155; 411/353, 517, 518, 519, 522

[56] References Cited

U.S. PATENT DOCUMENTS

| | | | |
|---|---|---|---|
| 1,392,818 | 10/1921 | Davis | 403/155 |
| 2,491,310 | 12/1949 | Heimann | 411/517 |
| 2,524,273 | 10/1950 | Saler | 403/155 |
| 2,840,892 | 7/1958 | Erdmann | 29/229 X |
| 2,870,529 | 1/1959 | Erdmann | 29/229 |
| 3,134,168 | 5/1964 | Erdmann | 29/229 X |
| 3,469,494 | 9/1969 | Frailly | 411/517 |
| 3,535,977 | 10/1970 | Baumgarten | 411/517 |
| 3,995,360 | 12/1976 | Millheiser | 29/229 |
| 4,313,696 | 2/1982 | Horton | 405/259 |
| 4,454,642 | 6/1984 | Liechty | 29/229 |
| 4,856,169 | 8/1989 | Liechty | 29/283 |

FOREIGN PATENT DOCUMENTS

| | | | |
|---|---|---|---|
| 2440992 | 3/1976 | Fed. Rep. of Germany | 29/229 |
| 56-354 | 5/1981 | Japan | 29/229 |
| 372584 | 5/1932 | United Kingdom | 411/517 |
| 457087 | 11/1936 | United Kingdom | 411/517 |
| 649860 | 2/1951 | United Kingdom | 411/517 |
| 662519 | 6/1951 | United Kingdom | 411/517 |

Primary Examiner—Joseph M. Gorski
Assistant Examiner—Peter Dungba Vo
Attorney, Agent, or Firm—Edward J. Timmer

[57] ABSTRACT

An apparatus is disclosed for compressing a retainer ring to reduced assembly size and maintaining the compressed ring assembly size at an assembly location by internal containment means. The apparatus typically includes a ring compressing assembly for compressing the ring from the exterior and mandrel means disposed in the compressing means and around which the ring is compressed to assembly size. The mandrel means includes a lug-retaining groove means into which retainer ring lugs having special flats are compressed and retained interiorly of the ring to hold the ring at reduced assembly size. The compressed retainer ring is carried to the assembly location outside the compressing means on the mandrel means and is stripped from the mandrel means for final assembly internally in a part. The ring compressing assembly is carried on a first slide for movement between a ring load position and a ring assembly position. A ring pusher mechanism is carried on a second slide that is operably connected to the first slide for movement in unison therewith as the ring compressing assembly is moved between the ring load position and the assembly position. After the ring compressing assembly is positioned at the assembly position, an actuator carried on the second slide and connected to the first slide moves the second slide toward the first slide to cause ring pusher rails on the second slide to move the ring through the compressing assembly and onto the article. The first slide is held stationary against a stop by the second slide during movement of the ring through the compressing assembly.

8 Claims, 15 Drawing Sheets

METHOD FOR ASSEMBLING A RETAINER RING ONTO AN ARTICLE

This is a division of application Ser. No. 337,895, filed on Apr. 14, 1989 now U.S. Pat. No. 4,982,484 which is a continuation-in-part application of Ser. No. 600,237 filed Apr. 16, 1984, now abandoned which is a division of Ser. No. 362,203 filed Mar. 26, 1982, now U.S. Pat. No. 4,454,642 issued June 19, 1984.

FIELD OF THE INVENTION

The present invention relates to an apparatus for compressing a retainer ring to size and assembling the compressed ring onto an article, such as a piston for an internal combustion engine.

BACKGROUND OF THE INVENTION

Resilient retainer rings having spaced apart lugs are widely used in the assembly of articles of manufacture to hold various components thereof together. For example, the wrist pin joining the piston and connecting rod of an internal combustion engine is held in the piston bore by an internal retainer ring inserted into grooves in opposite pilot sections of the piston bore. Retainer rings having a flat side profile and shape shown in FIG. 11 have in the past been used in holding the wrist pin in the piston bore of automobile diesel engines. Various attempts have been made by prior art workers to devise automated or semi-automated apparatus for compressing these flat retainer rings and maintaining the ring at the compressed assembly size for insertion in the piston bore. These apparatus have generally utilized an external containment system such as a thin tapered sleeve positioned around the compressed ring to maintain the compressed condition at the assembly location. However, the use of such thin external containment sleeves has been disadvantageous as a result of the vulnerability of the sleeves to wear by friction contact with the ring and also as a result of the requirement for additional clearance space necessary to enable insertion of the retainer ring and external sleeve in the piston bore.

Illustrative of this and other prior art approaches are the Erdmann U.S. Pat. Nos. 2,840,892; 2,870,529 and 3,134,168.

Due to the inadequacies in existing ring compressing apparatus, flat profile retainer rings in many cases are still assembled in the bore of certain pistons by hand using plier type tools with probe pins to engage the small hole provided in each lug of the retainer rings. Of course, assembly in this manner is more time consuming than assembly by automated or semi-automated means and also is more inconsistent in terms of the achievement of uniform compression of the retainer rings and accurate placement in the piston bore.

Thus, what is still needed is an apparatus, preferably amenable to automatic or semi-automatic operation, for compressing such retainer rings to assembly size and maintaining the compressed ring size with the external ring periphery fully exposed for insertion into the piston bore or other part internal bore.

SUMMARY OF THE INVENTION

The present invention contemplates an apparatus for assembling a retainer ring having spaced apart lugs onto an article comprising (a) a ring configuring assembly (e.g., a ring compressing assembly) for imparting a configuration to the ring to facilitate assembly on the article when the ring is moved along the assembly, (b) means for moving the ring configuring assembly between a ring load position to receive an uncompressed retainer ring and a ring assembly position adjacent the article, and (c) means for moving the ring along the ring configuring assembly to reconfigure the ring for assembly and to move the reconfigured ring onto the article. The ring moving means is cooperably connected to the ring configuring assembly for movement in unison therewith as the ring configuring assembly is moved between the ring load position and the assembly position and for movement relative to and preferably toward the ring reconfiguring assembly after the ring reconfiguring assembly is positioned at the assembly position so as to move the ring along the ring reconfiguring assembly to reconfigure same to assembly size and to move the reconfigured ring onto the article.

The invention also contemplates an apparatus for assembling an internal retainer ring having spaced apart lugs in a bore of an article comprising (a) a ring compressing assembly movable between a ring load position and an assembly position adjacent the article, said ring compressing assembly being configured to compress the retainer ring to a reduced assembly size as it is moved therethrough, (b) first slide means having the ring compressing assembly thereon for positioning the ring compressing assembly at the ring load position to receive an uncompressed retainer ring and then to position the ring compressing assembly at the assembly position adjacent the article, (c) means for moving the retainer ring through the ring compressing assembly and into the bore of the article after the compressing assembly is positioned at the assembly position, said moving means including a ring pusher member for contacting the retaining ring and a second slide means on which the pusher means is disposed, said second slide means being operably coupled to the first slide means for movement in unison with the first slide means as the ring compressing assembly is moved between the ring load position and the assembly position and movable relative to and toward the first slide means after the ring compressing assembly is at the assembly position to cause the pusher means to push the retainer ring through the compressing assembly to compress it to reduced assembly size and into the bore of the article.

In one embodiment of the apparatus of the invention, a first actuator means, such as a fluid cylinder, is connected to the first slide and moves the first slide and second slide in unison to position the ring compressing assembly at the ring load position or the assembly position. A second actuator, such as a hydraulic cylinder, is carried on the second slide and is operably connected to the first slide to cause the second slide and pusher means thereon to move toward the first slide while it is held stationary to move the ring through the ring compressing assembly to compress and assemble the retainer ring in the bore of the article. Stop means are provided to maintain the first slide stationary as the second slide is moved toward and relative thereto.

In another embodiment of the apparatus of the invention, the ring compressing assembly includes a mandrel disposed therein and the retainer ring is compressed and retained on the mandrel as it is moved through the ring compressing assembly onto the bore of the article and further includes centering means movable therewith to center the bore of the article relative to the mandrel as the ring compressing assembly is moved to the assembly position. The centering means may comprise angled centering surfaces that locate on the article as the ring compressing assembly is positioned at the assembly position to move the article in a manner to center the bore thereof with the mandrel.

The present invention also contemplates a mandrel and retainer ring combination including a mandrel having an elongate, lug-retaining groove means with opposing spaced apart sides, and a retainer ring comprising a C-shaped, arcuate portion disposed around the mandrel and terminating in a pair of lugs extending inwardly of the ring when viewed in plan with the retainer ring compressed in size on the mandrel by virtue of said lugs having oppositely facing, outer retaining sides (e.g., flats or radiused surfaces) engaged between the spaced apart sides of the groove means whereby the ring is retained interiorly at compressed assembly size on the mandrel for assembly in the bore of an article without the need for external ring containment.

The present invention also contemplates a mandrel and retainer ring combination including a mandrel having an elongate, lug-retaining groove means with opposing spaced apart sides and an elongate, ring-orienting groove means spaced circumferentially from the lug-retaining groove means and a retainer ring comprising a C-shaped, arcuate portion disposed around the mandrel and having an orienting lug extending inwardly of the ring received in the ring-orienting groove means and having a pair of retaining lugs extending inwardly of the ring when viewed in plan with the retainer ring compressed in size on the mandrel by virtue of said lugs having oppositely facing, outer retaining sides (e.g., flats) engaged between the spaced apart sides of the lug-retaining groove means whereby the ring is oriented and retained interiorly at compressed assembly size on the mandrel for assembly in the bore of the article without the need for external ring containment. Preferably, the ring-orienting groove means is disposed on the opposite side of the mandrel from the lug-retaining groove means. The orienting lug of the retainer ring preferably extends inwardly of the retainer ring toward the retaining lugs.

In one embodiment of the mandrel and retainer ring combination, the retaining lugs also include inner facing sides that are in contact when the outer sides thereof are engaged between the sides of the groove means.

Further features as well as other objects and advantages of the present invention will be apparent by reference to the following detailed description taken with the accompanying drawings described herebelow.

BRIEF DESCRIPTION OF THE DRAWINGS

FIG. 15 is a plan view of the apparatus of FIG. 13.

FIG. 21 is an elevation of retainer ring adapted for assembly using the apparatus of FIG. 13.

DESCRIPTION OF PREFERRED EMBODIMENTS

Figure 9:
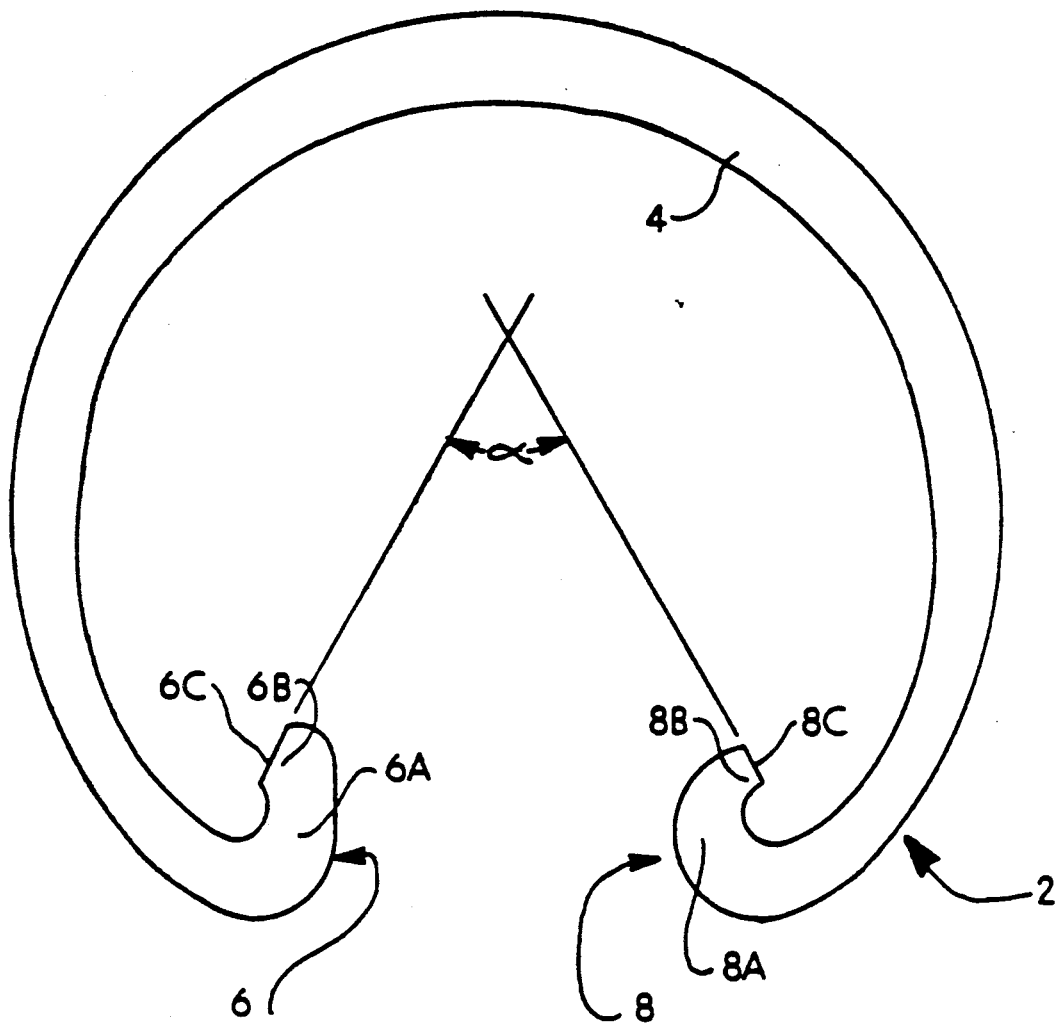
FIG. 9 is a plan view of a preferred retainer ring.
Figure 10:
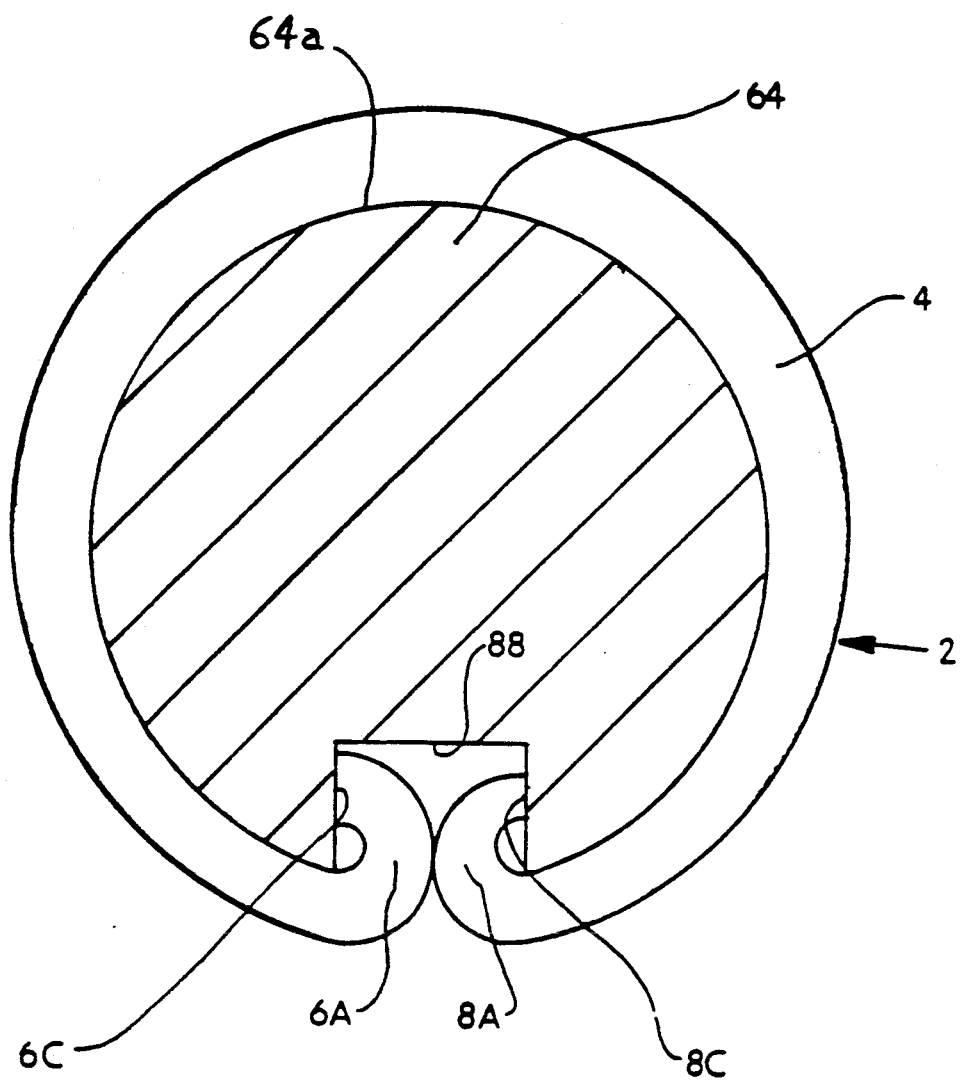
FIG. 10 is an enlarged sectional view of the mandrel with a compressed retainer ring held thereon.
Figure 11:
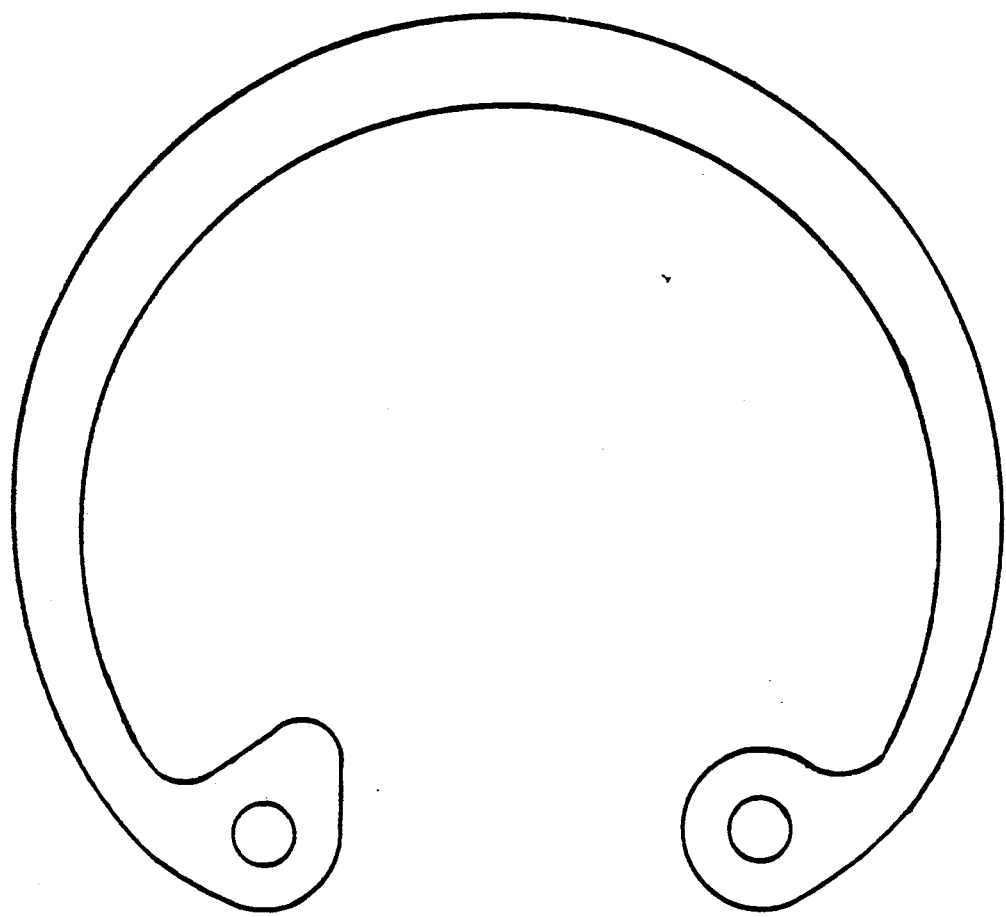
FIG. 11 is a plan view of a prior art retainer ring.

FIGS. 1–8 illustrate a preferred apparatus constructed according to the present invention for compressing the retainer ring shown in FIG. 9 to assembly size and holding the ring at assembly size at an assembly location. The particular retainer ring 2 shown in FIG. 9 is designed for use in the assembly of a piston, connecting rod and wrist pin (see FIG. 12) for a conventional automobile diesel engine. The retainer ring 2 includes a C-shaped portion 4 having a circular outer profile in plan and a non-circular inner profile in plan when in the uncompressed condition shown in the figure. The ends of the C-shaped portion terminate in lugs 6 and 8 which are spaced apart in the uncompressed ring condition. The lugs include first portions 6a and 8a extending inwardly into the ring when viewed in plan and second portions 6b and 8b directed back upon themselves in generally opposite directions as shown with the directed-back portions terminating in flats (sides) 6c and 8c facing away from one another. Typically, the ring is flat when viewed in elevation. An important feature of the retainer ring 2 is that the flats 6c and 8c are oriented in a certain predetermined angular relationship in the uncompressed condition, in particular planes coincident with flats 6c,8c are selected to intersect at an included angle (alpha) which insures that flats 6c,8c are in substantially parallel relationship when the retainer ring is compressed to assembly size with the inwardly extending lug portions 6a,8a touching (FIG. 10). An alpha angle of 80° has been used to provide parallel flats with the lugs touching. As will be explained in more detail hereinafter, flats 6c,8c in prescribed angular relation facilitate holding of the retainer ring at the compressed assembly size for final assembly.

Of course, the retainer ring may be provided with different configurations, dimensions, alpha angle and the like depending upon the intended application. Typically, the ring is made from heat treated SAE 1060-1090 steel.

Figure 1:
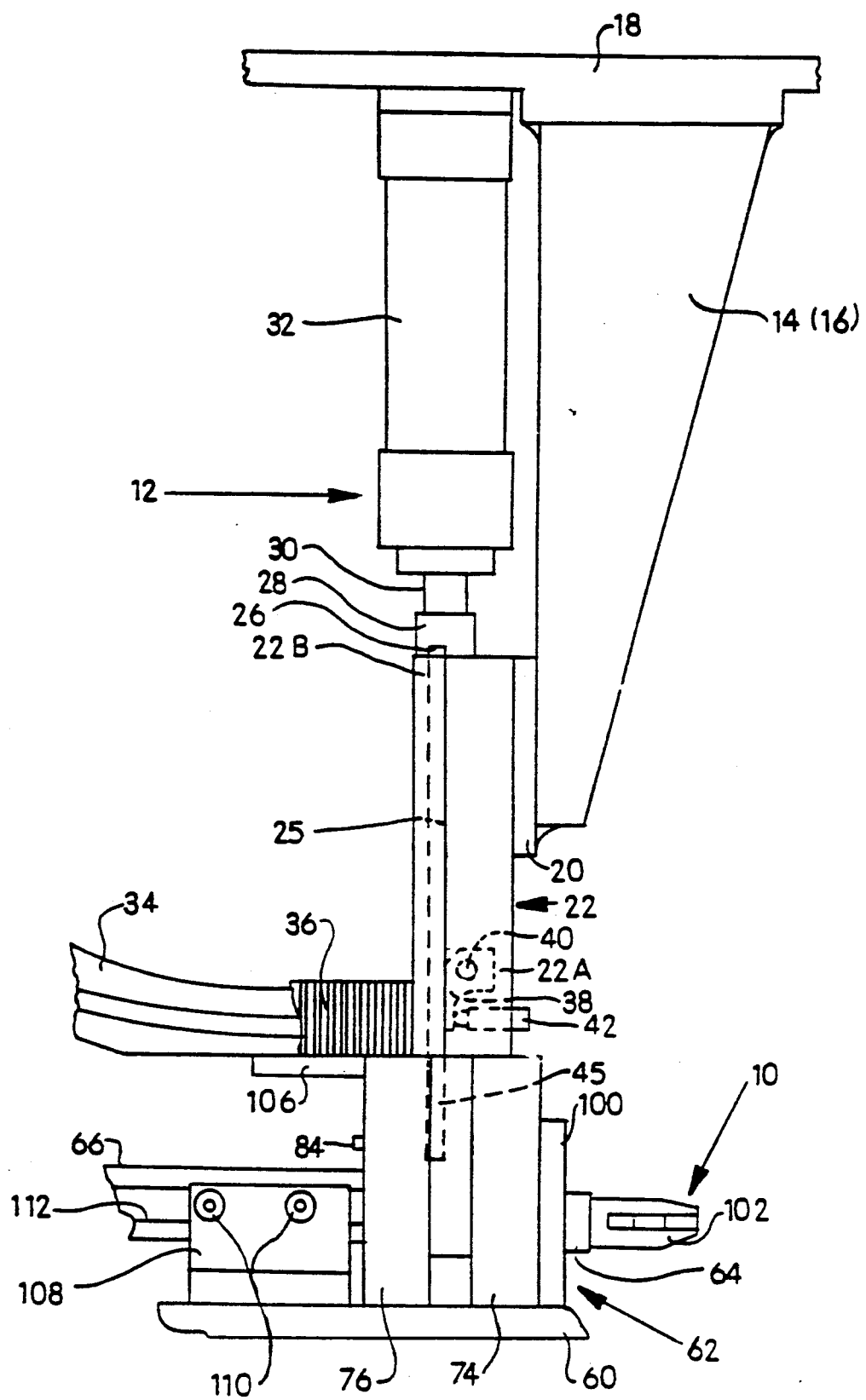
FIG. 1 is a partial side elevation of a preferred apparatus of the invention.
Figure 2:
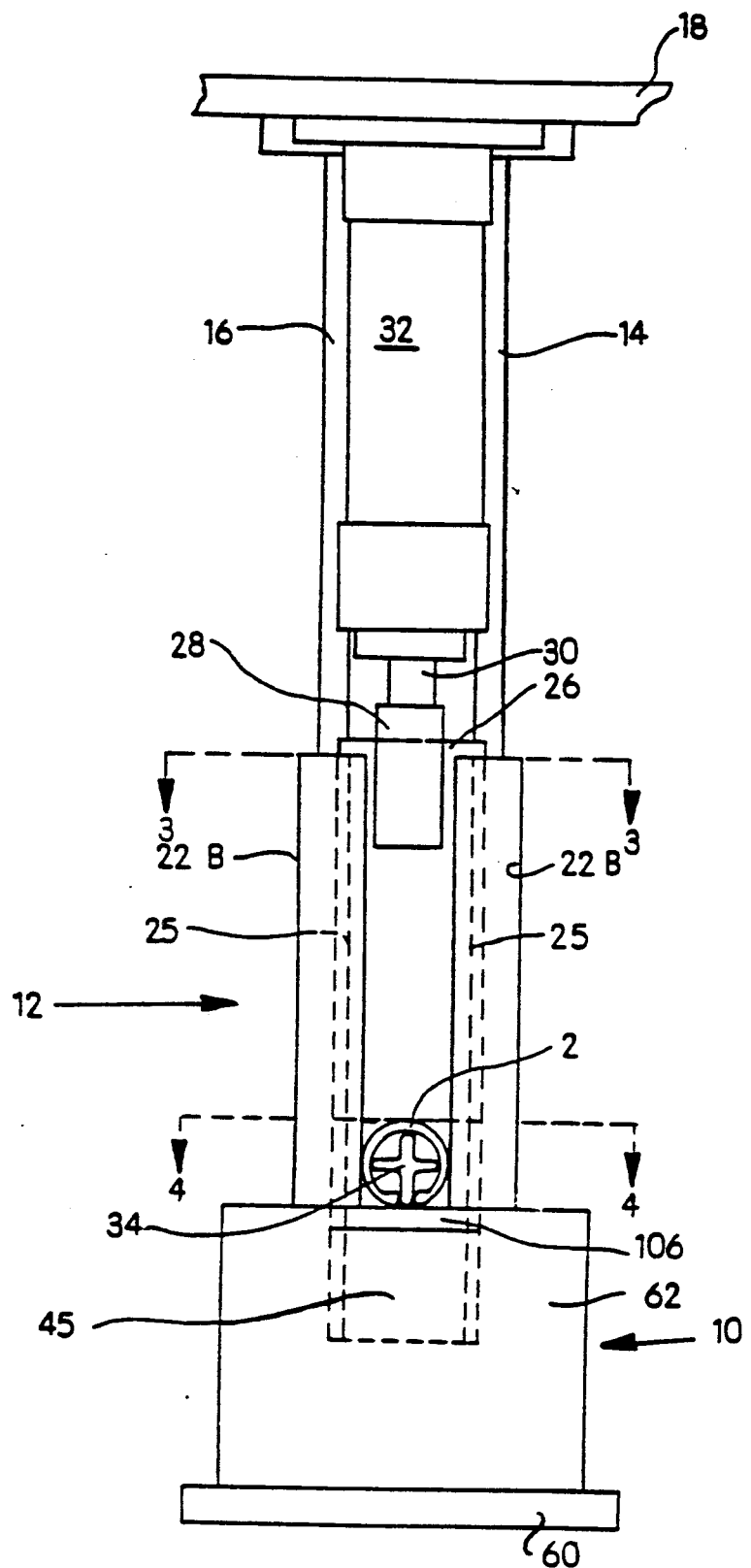
FIG. 2 is a side elevation taken 90° from that of the preceding figure.
Figure 3:
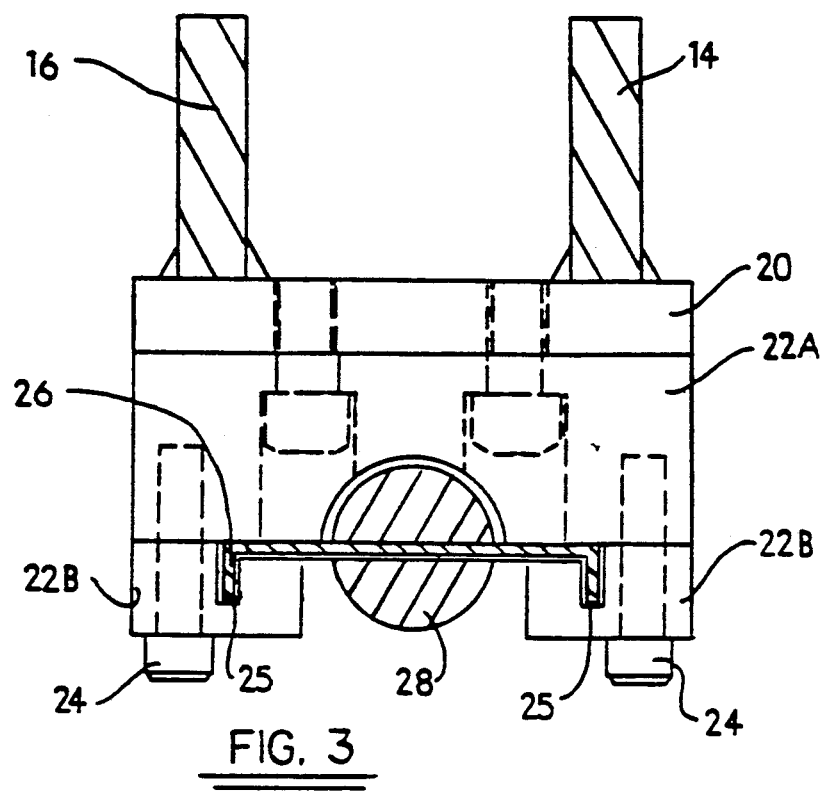
FIG. 3 is a sectional view along line 3—3 of FIG. 2.
Figure 4:
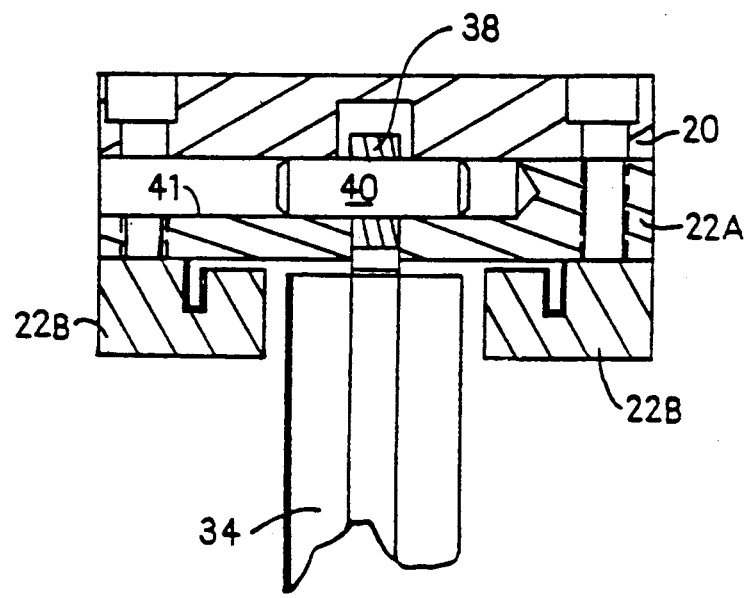
FIG. 4 is a sectional view along line 4—4 of FIG. 2.

As shown in FIGS. 1 and 2, the apparatus of the invention in broad terms includes a ring compressing means 10 for compressing and holding the retainer ring of FIG. 9 at assembly size and preferably also for supplying the compressed ring to an assembly location for joining of other components such as the diesel piston, wrist pin and connecting rod and loading means 12 for delivering an uncompressed retainer ring to the ring compressing means 10 with the ring oriented in predetermined fashion for compression to assembly size.

The loading means 12 comprises a pair of vertical, spaced support plates 14,16 of triangular shape welded or otherwise attached at the upper end to horizontal frame member 18 and similarly attached at its lower end to a vertical frame member 20. Vertical frame 20 in turn is attached to a retainer ring injector guide 22 comprising a vertical guide block 22a and a pair of spaced apart vertical guide rails 22b fastened to guide block 22a by bolts 24, FIG. 3. It is apparent that guide block 22a and guide rails 22b together define a pair of L-shaped guide slots 25 along their vertical lengths. It is also apparent that a U-shaped injector plate 26 is disposed in the guide slots 25 for up and down reciprocating movement therein for purposes to be described hereinbelow. Injector plate 26 is fastened to support rod 28 which in turn is connected to the shaft 30 of hydraulic cylinder 32 mounted on horizontal frame member 18. Cylinder 32 is of course actuated to move injector plate 26 up and down in guide slots 25.

The loading means 12 is provided with a retainer ring feed rail 34 having a cross-section shown in FIG. 2 on which a stack 36 of uncompressed retainer rings is fed to the injector plate 26 with the retainer ring lugs 6,8 oriented in the downward direction relative to FIG. 2. The stack 36 of retainer rings is typically comprised of 1200 rings; of course, other numbers of rings can be provided. As shown best in FIG. 4, the retainer ring feed rail 34 terminates in the space between guide rails 22b short of and facing a first guide lever 38 which is pivotably mounted in guide block 22a by pivot shaft 40 in passage 41.

Figure 7:
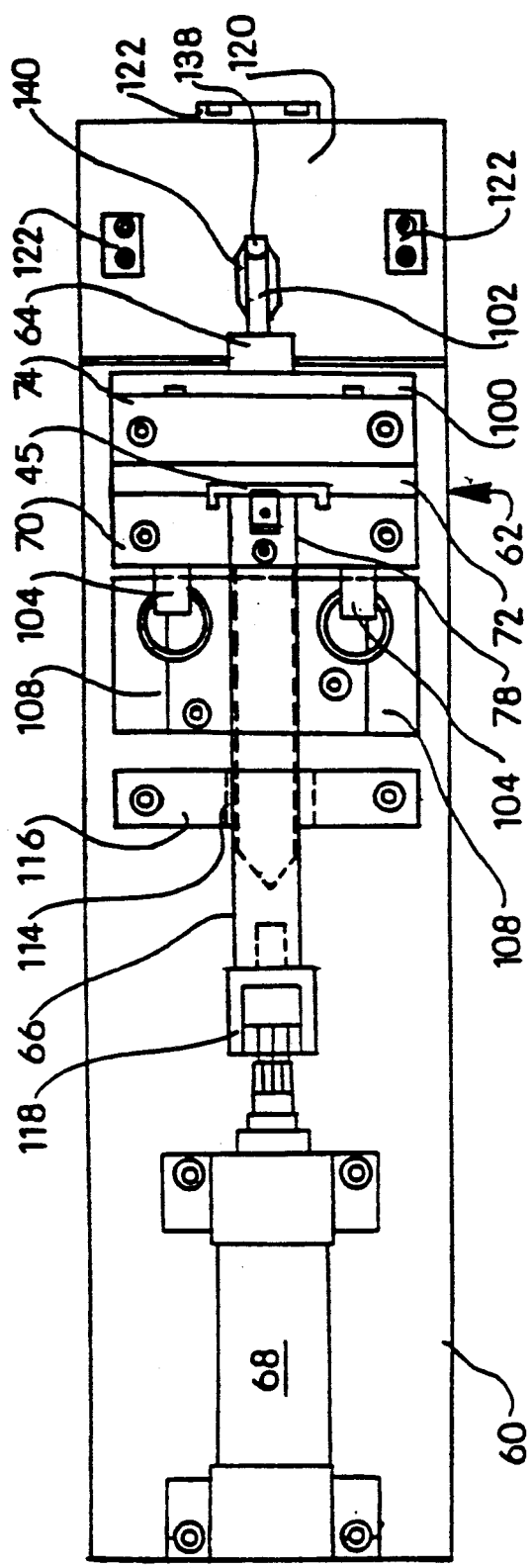
FIG. 7 is a top elevation of the ring compression assembly.
Figure 8:
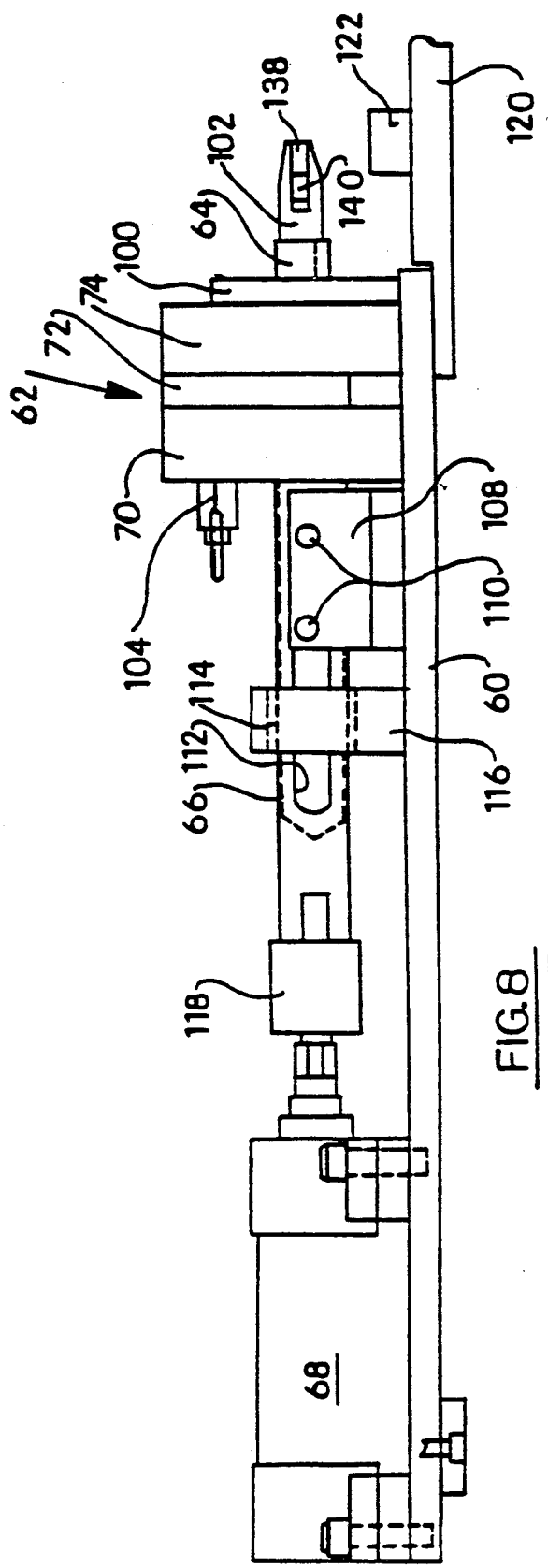
FIG. 8 is a side elevation of the ring compression assembly.

As the stack of retainer rings descends down the feed rail 34, it eventually abuts the lever 38 which is biased outwardly toward the stack by spring-biased plunger 42. The lever functions to hold an individual retainer in the lugs-down position in the path of the injector plate 26 centrally between guide rails 22b. Thus, as the injector plate 26 descends, it will shear an individual retainer ring from the stack 36 for injection into the ring compressing means 10 therebelow through access slot 45 therein which is in vertical alignment with guide slots 25 and the injector plate 26 as best seen in FIGS. 1, 2 and 7. Of course, it is apparent that the stack 36 of retainer rings can be supplied onto feed rail 34 manually or by suitable rail loading means within the skill of the art.

As shown most clearly in FIGS. 1 and 5-8, the ring compressing means 10 is mounted below the loading means 12 to receive an individual retainer ring sheared from the stack 36 by the injector plate 26 during its downward movement. The ring compressing means includes a base member 60 on which are mounted a barrel assembly 62, mandrel 64, plunger tube 66 and hydraulic cylinder 68.

Figure 5:
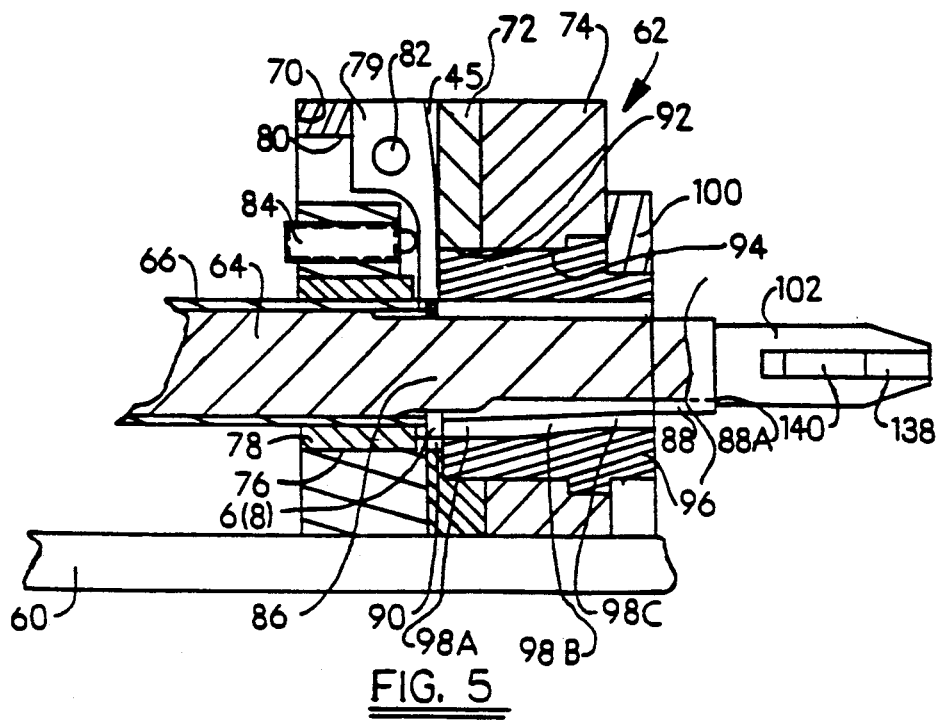
FIG. 5 is a sectional view of the ring compression assembly with the mandrel.
Figure 6:
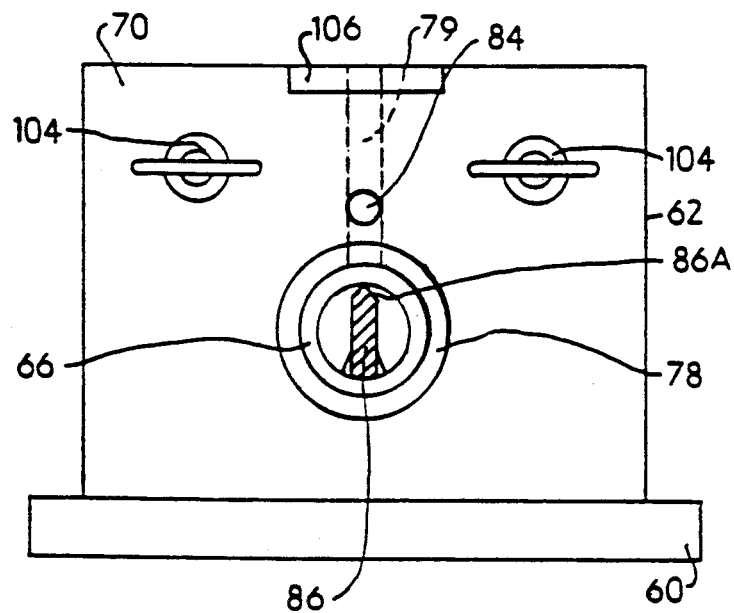
FIG. 6 is an end elevation of the ring compression assembly (inlet end).

Referring primarily to FIGS. 5 and 6, the barrel assembly 62 comprises a plurality of support bodies including first end body 70, an intermediate body 72 and a second end body 74. First end body includes a central aperture 76 in which a bushing 78 is received. The first end body 70 and intermediate body 72 are configured to define access slot 45 when the bodies are mated for entry of an individual retainer ring being injected by injector plate 26. A guide lever 79 is mounted in a cavity 80 in the first end body 70 by means of a pivot shaft 82 and is biased by spring loaded plunger 84 toward the intermediate body 72 into U-shaped access slot 45 to engage a retainer ring and maintain the lugs 6,8 thereof in the downward position so that the spaced apart lugs pass over the mandrel 64, in particular over the reduced end 86 which is generally rectangular in cross-section with a tapered top 86a over which the lugs slide. The tapered, reduced mandrel end 86 functions as a guide portion of the mandrel in front of the compression barrel member 96 to align the retainer ring lugs 6,8 in the down position with respect to the mandrel lug-engaging means shown as an elongated keyway or slot 88 therein. The intermediate body 72 further includes a stop surface 90 aligned beneath access slot 45 and against which the retainer ring abuts when injected fully onto the reduced mandrel end 86 by the injector plate, FIG. 5.

It is apparent that the intermediate body 72 and second end body 74 have coaxially aligned central apertures 92 and 94 which receive and locate a compression barrel member 96. The barrel member 96 includes a bore 98 therethrough with a first cylindrical inlet section 98a of a sufficient diameter to receive the uncompressed retainer ring, and intermediate tapered section 98b having a gradually decreasing diameter toward the end plate 100 and a second cylindrical outlet section 98c with a smaller diameter corresponding to the outlet diameter of the intermediate section 98b. The keyway 88 of the mandrel 64 is tapered gradually to open along the length thereof disposed in the first bore section 98a and sharply opens to full depth along the length thereof disposed in the tapered bore section 98b. The keyway 88 as shown extends through bore sections 98b and 98c out of the barrel assembly and terminates at the junction with the mandrel alignment nose 102, the end 88a of the keyway constituting an expansion portion of the mandrel to be described in more detail hereinbelow.

As shown, the support bodies 70,72,74 are initially aligned together by a pair of alignment pins 104 extending through suitable passages in the bodies. The bodies are of course securely fastened to base 60 by bolts (some of which are shown in FIG. 7) or other appropriate means. A horizontally extending support plate 106 is attached to first end body 70 and provides support to the feed rail 34 as shown in FIG. 1.

The mandrel 64 is supported inside the compression barrel member 96 and cylindrical plunger tube 66 by means of a pair of mandrel side supports 108 into the mandrel 64 through elongate slots 112 on each side of the plunger tube. The supports 108 are attached to the base 60 by bolts or other suitable means.

As noted previously, a bushing 78 is seated in the first end member 70. A second bushing 114 is also seated in tube 116 to support the other end of the plunger tube for sliding movement through bore 98 of the barrel assembly to the assembly location as will be explained. A hydraulic cylinder 68 is also mounted on base 60 and is connected to the solid end of the plunger tube 66 by means of coupling 118. The cylinder slides the plunger toward or away from the barrel assembly.

In operation, an individual retainer ring is sheared from the ring stack 36 by downward movement of injector plate 26 which pushes the ring through access slot 45 in the barrel assembly and onto the reduced end 86 of the mandrel 64 in front of compression member 96 with the retainer ring lugs oriented down, FIG. 5. The plunger tube 66 is then moved to the right in FIG. 5 by cylinder 68 so as to engage the retainer ring positioned on reduced mandrel end 86 and push it through the compression barrel member 96 during which the ring is gradually compressed in size in tapered bore section 98b and fully compressed to assembly size with the lugs 6,8 being compressed into and retained in keyway 88 with the lug portions 6a,8a touching during passage of the ring through bore section 98c. The ring is thus compressed to assembly size on the mandrel 64 which has a diameter selected to this end and retained thereon by the lugs being retained in the keyway 88 as shown in FIG. 10. The ring is pushed along the mandrel 64 through bore 98 and out the other side of the barrel assembly to the mandrel nose 102 where the compressed-to-size retainer ring is stripped by the plunger tube moving the ring past the keyway end 88a to the reduced cross-section nose where the ring expands in size.

Figure 12:
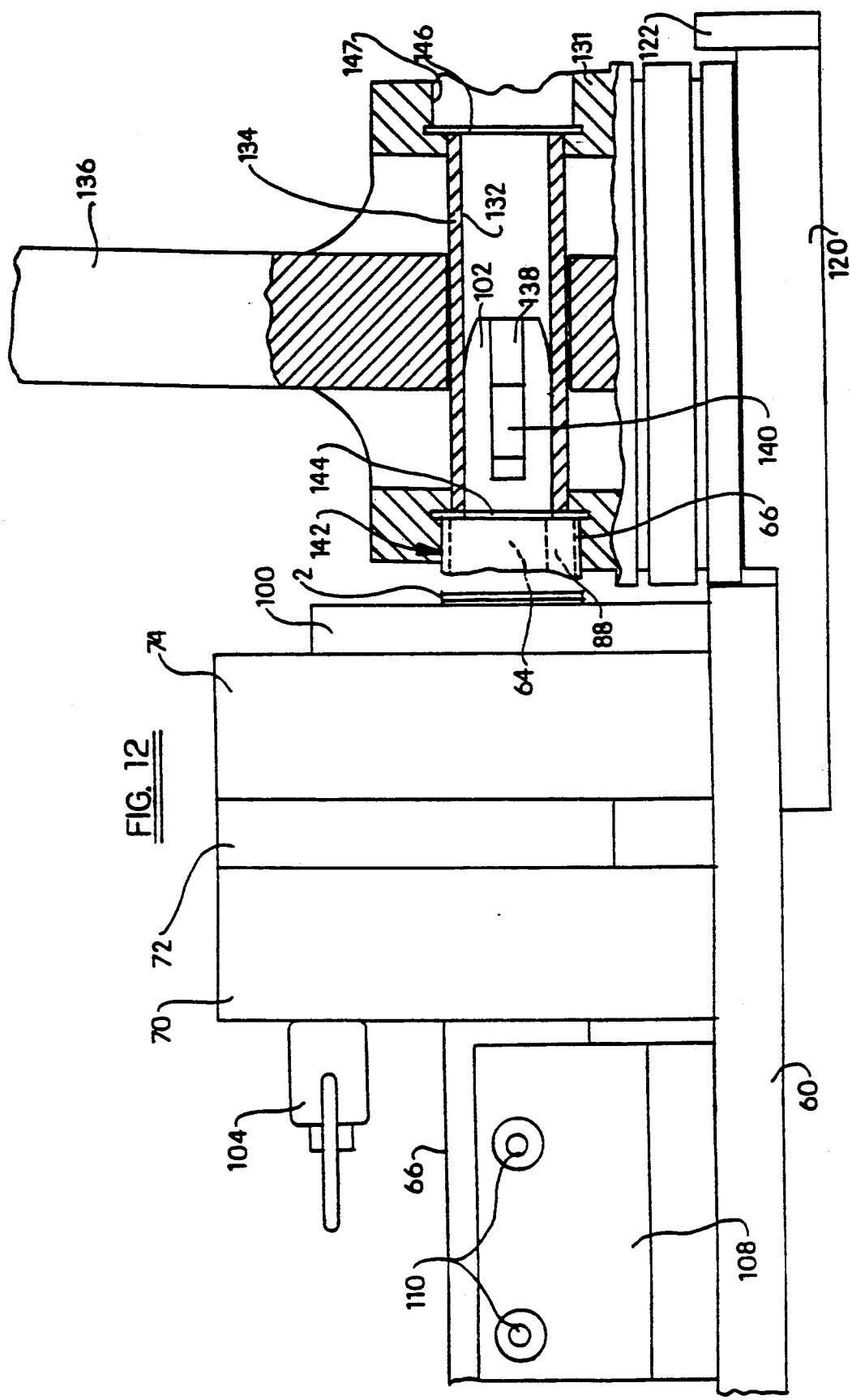
FIG. 12 is a side elevation of a preferred ring compression assembly having an assembly table on which a piston, wrist pin and connecting rod (shown in partial section) are assembled.

FIG. 12 shows how essentially automatic assembly of the compressed ring into a diesel piston 131 is effected in a preferred apparatus. As shown, the base 60 is provided with an assembly table 120 and stops 122 on which the piston 131 is positioned in a head-down orientation, as shown, with the mandrel nose 102 inserted and aligned in the bore 132 of the wrist pin 134 already mounted in the piston along with the connecting rod 136. The mandrel nose 102 includes tapered pilot ribs 138 and full ribs 140 providing the proper alignment diameter. It is apparent that the diameter of the plunger tube 66 is selected to mate closely with the pilot bore 142 of the diesel piston 13 and that the length of the mandrel 64 is selected to effect termination of the lug-retaining keyway 88 at end 88a immediately adjacent the enlarged ring-receiving groove 144 of the piston. When the plunger tube 66 pushes the compressed retainer 2 ring past the end of the keyway 88, the retainer ring will expand into the groove 144 completing assembly of that side of the wrist pin in the piston. Preferably, an identical apparatus as that described hereinabove is positioned on the other side of the piston and simultaneously inserts the other retainer ring in ring-receiving groove 146 through pilot bore 147, completing assembly of the piston, wrist pin and connecting rod with the pair of retainer rings.

Figure 13:
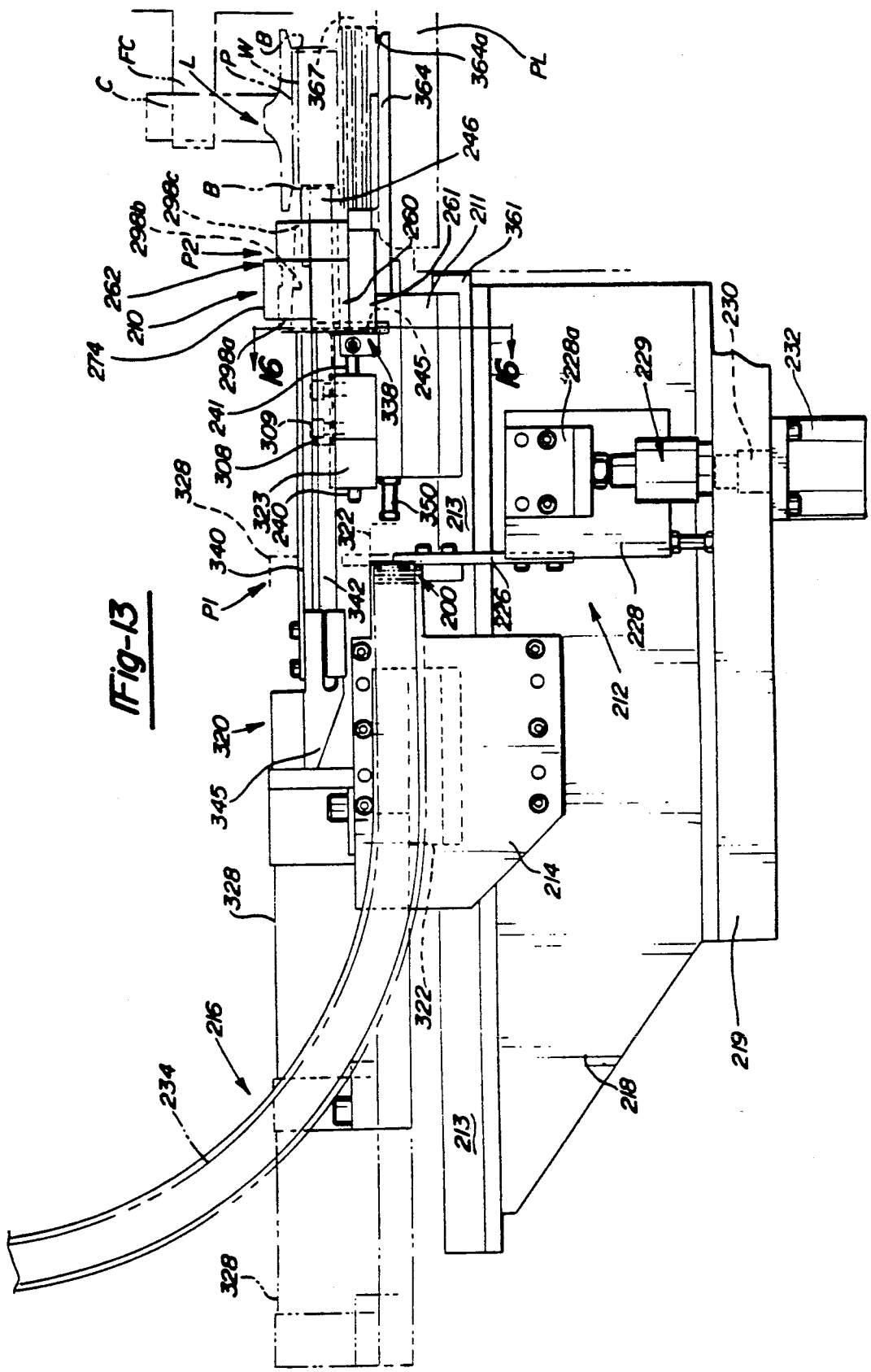
FIG. 13 is side elevation of a more preferred apparatus of the invention.
Figure 14:
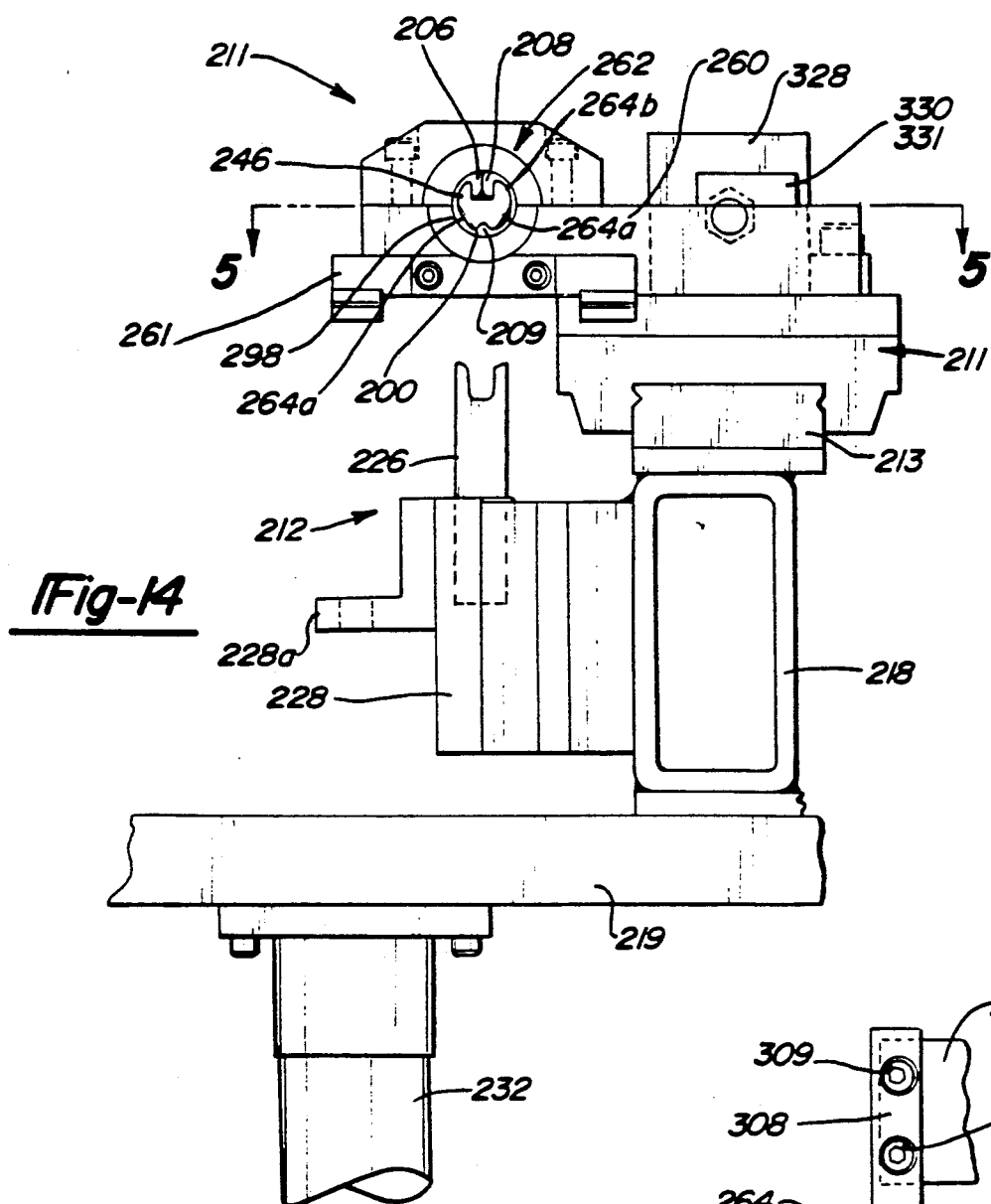
FIG. 14 is an end elevation taken in the direction arrows 14 of FIG. 13.
Figure 16:
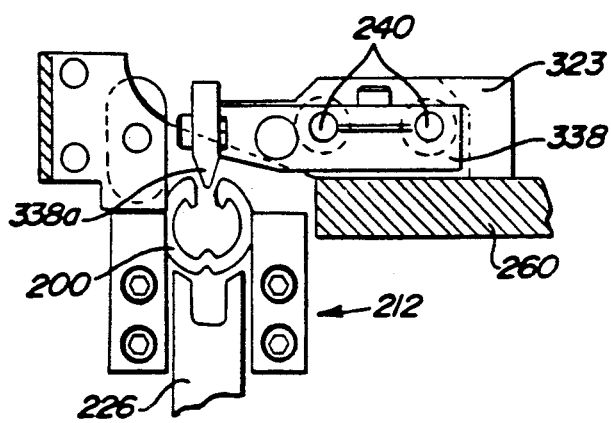
FIG. 16 is a partial sectional view taken along lines 16—16 of FIG. 13.
Figure 17:
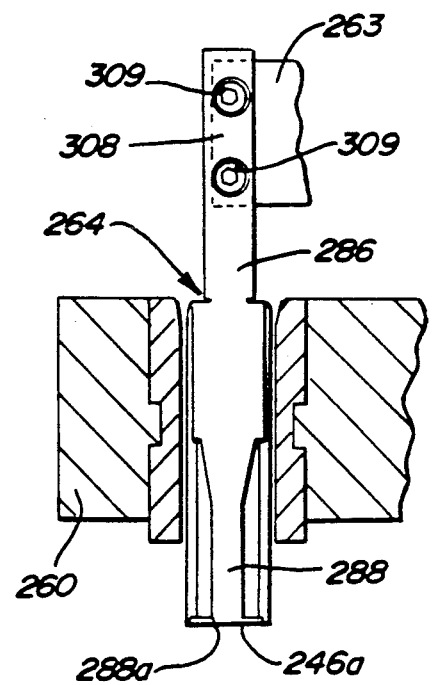
FIG. 17 is an elevational view taken in the direction of arrows 17 in FIG. 14 with some components of the compressing assembly removed.
Figure 18:
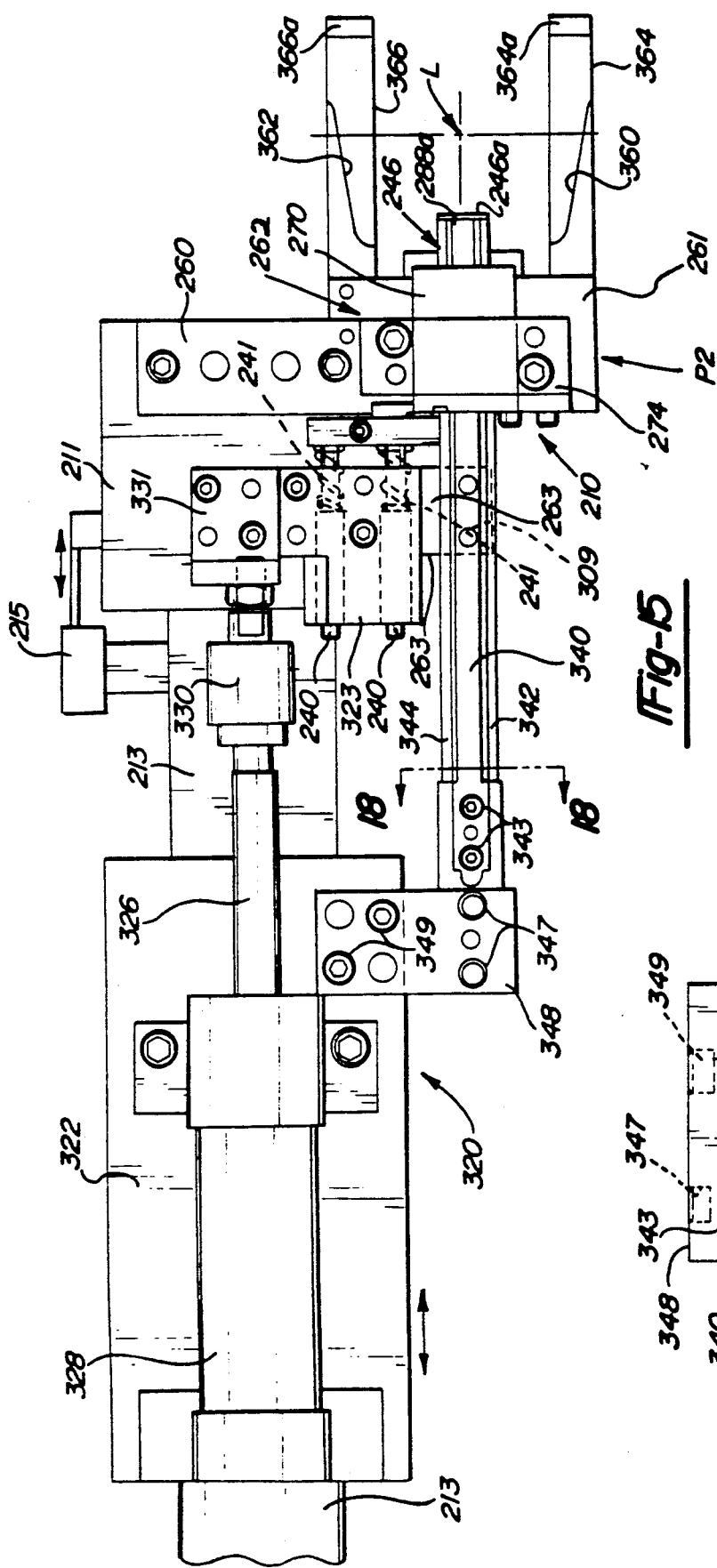
FIG. 18 is a partial sectional view taken along lines 18—18 of FIG. 15.

FIGS. 13-20 illustrate a preferred apparatus constructed according to the present invention for compressing the retainer ring 200 shown in FIG. 21 to assembly size and holding the ring at assembly size at an assembly location. The particular retainer ring 200 shown in FIG. 21 is designed for use in the assembly of a piston P, connecting rod C and a wrist pin W in the bore B of the piston (see FIG. 13) for a conventional automobile engine. The retainer ring 200 includes a C-shaped arcuate portion 204 having a non-circular outer profile in plan and a non-circular inner profile in plan when in the uncompressed condition shown in FIG. 21. The ends of the C-shaped portion terminate in end lugs 206 and 208 which are spaced apart in the uncompressed ring condition. The end lugs extend inwardly of the ring when viewed in plan and include outer, oppositely facing, retaining sides (flats) 206a,208a and inner, facing sides (flats) 206b,208b. An orienting lug 209 extends inwardly of the ring 200 when viewed in plan toward and between the end lugs 206,208. Typically, the ring is flat when viewed in elevation. As described for FIG. 9, an important feature of the retainer ring 200 is that the outer sides 206a,208a are oriented in a certain predetermined angular relationship in the uncompressed condition and, in particular, planes coincident with sides 206a,208a are selected to intersect at an included angle α (alpha) which insures that sides 206a,208a are in substantially parallel relationship when the retainer ring is compressed to assembly size with the inner lug sides 206b,208b touching as shown in FIG. 14. The desired alpha angle can be selected to provide such parallel sides 206a,208a when the ring is compressed with the lugs 206,208 retained in a mandrel groove 288. As will be explained in more detail hereinafter, sides 206a,208a in prescribed angular relation facilitate holding of the retainer ring at the compressed assembly size for final assembly in piston bore B.

Of course, the retainer ring may be provided with different configurations, dimensions, alpha angle and the like depending upon the intended application. In particular, the outer sides 206a,208a may form a dovetail shape, when the ring 200 is compressed with the lugs 206,208 touching in the groove 288. Groove 288 would have side walls defining a complementary dovetail shape to receive and retain the lugs 206,208. Typically, the ring is made from heat treated SAE 1060-1090 steel.

As shown in FIGS. 13-15, the apparatus of the invention in broad terms includes (a) a ring compressing assembly 210 (ring configuring assembly) for compressing and holding the retainer ring of FIG. 21 at assembly size as the compressed ring is moved to an assembly location L for joining of the piston, wrist pin and connecting rod, (b) a ring supply means 216 and (c) ring injector means 212 for delivering an uncompressed retainer ring to the ring compressing assembly 210 with the ring oriented in predetermined fashion for compression to assembly size.

The ring compressing assembly 210 is carried on a first, horizontal slide 211 that is slidably mounted on a slideway 213 affixed on the horizontal, hollow frame or base 218. A suitable actuator 215, shown schematically in FIG. 15, moves the slide 211 to position the compressing assembly 210 at a ring loading position P1 or at an assembly position P2 adjacent the assembly location L. The actuator 215 may comprise a hydraulic, electrical, mechanical or other type of known actuator supported from the frame or base 218.

As will become apparent herebelow, the ring supply means 216 and the assembly location L are stationary relative to the compressing means 210 which is moved alternately to the ring load position P1 adjacent ring supply means 216 or to the assembly position P2 adjacent the assembly location L.

Figure 19:
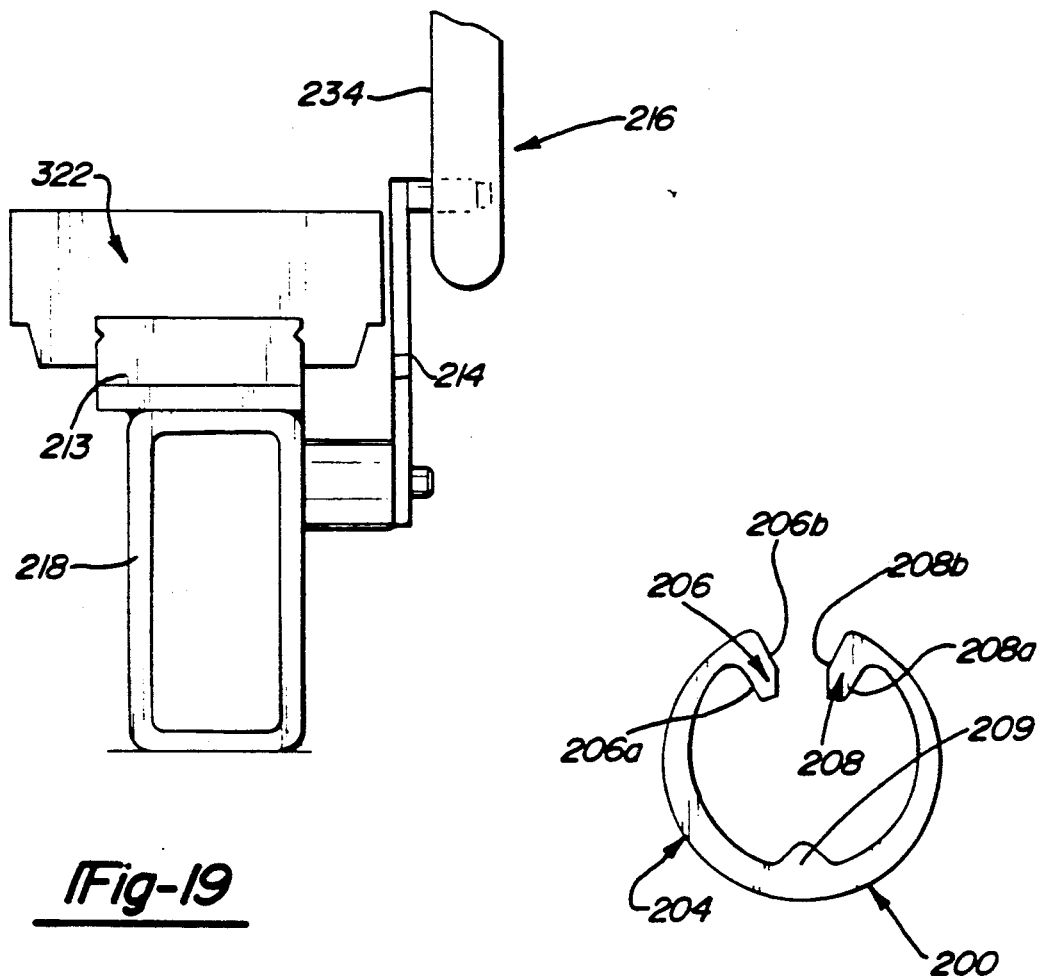
FIG. 19 is a partial end elevational view taken in the direction of arrows 19 in FIG. 13.
Figure 20:
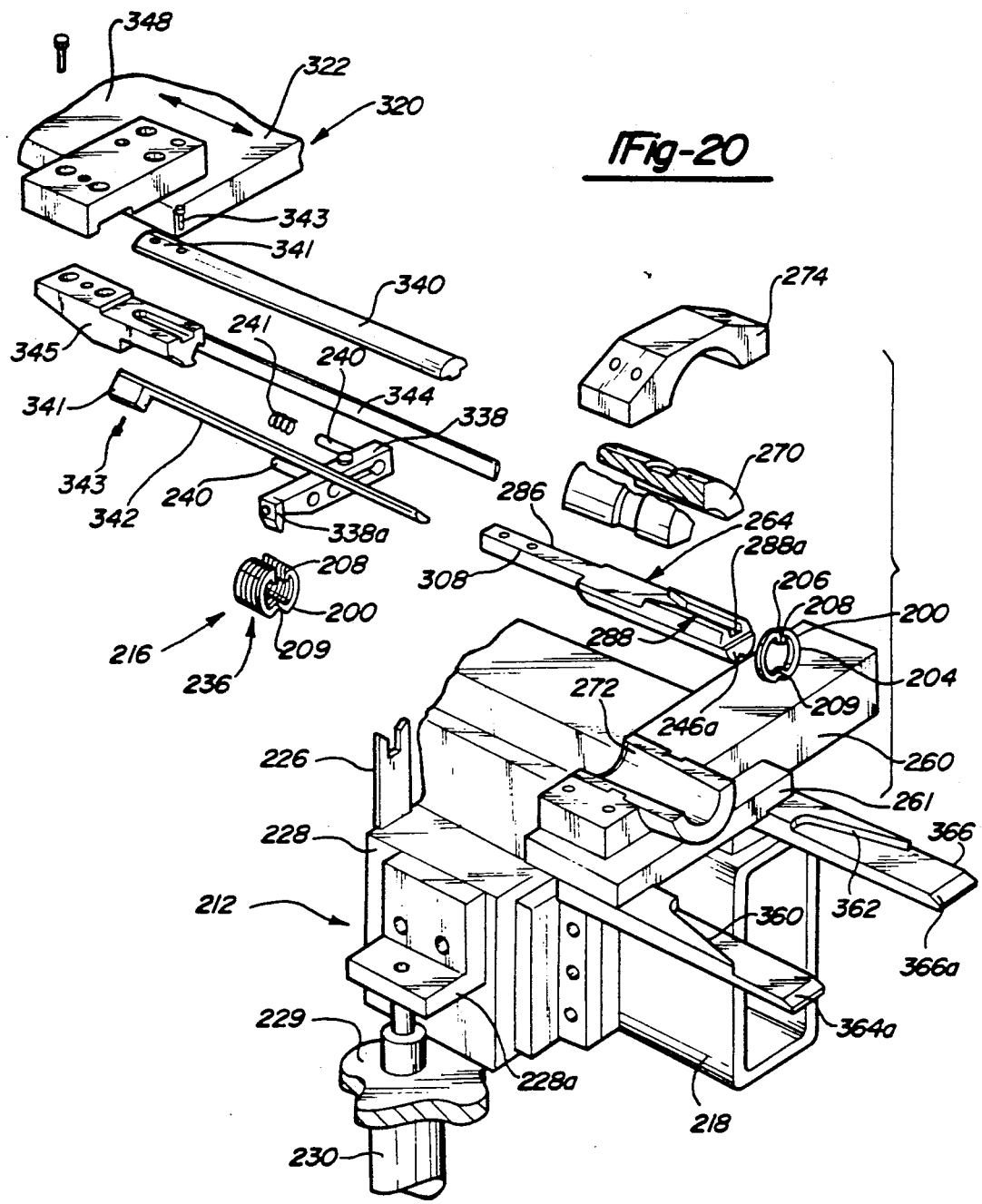
FIG. 20 is an exploded view of a part of the apparatus of FIG. 13.

In particular, the ring supply means 216 comprises a vertical plate 214 screwed or otherwise attached at the lower end to horizontal, hollow frame member 218, FIG. 19. The ring supply means 216 also includes a retainer ring feed rail 234 having a cross-section similar to that shown in FIG. 2 (but modified to accommodate the different configuration of retainer rings 200) on which a stack 236 of uncompressed retainer rings 200 is fed to the injector means 212, in particular to an injector plate 226, with the retainer ring lugs 206,208 oriented in the upward direction relative to FIGS. 13-15. As shown best in FIG. 13, the retainer ring feed rail 234 terminates adjacent the ring load position P1. When the ring compressing assembly 210 is positioned at the ring load position P1, the feed rail 234 is positioned to supply an uncompressed retainer ring 200 for pickup by the injector plate 226. A first guide lever 338 disposed on the ring compressing assembly 210 includes a pencil point nose 338a above the injector plate 226 in the path of the retainer ring 200 to be supplied to the ring compressing assembly 210. The guide lever 338 is mounted on guide block 323 that slides horizontally on shafts 240 relative to return springs 241 around the shafts 240. Guide block 323 is affixed on the first slide 211.

As the stack of retainer rings 200 descends down the feed rail 234, it eventually abuts the lever 338 (when the ring compressing assembly 210 is positioned at the ring load position P1) which is biased to the right in FIG. 15 by the springs 241 to a normally closed position. The nose 338a of the guide lever 338 functions to hold an individual retainer in the lugs-up position as the U-shaped injector plate 226 is moved upwardly to shear the retainer ring from the stack 236 and move it to the compressing means 210. Thus, as the injector plate 226 ascends, it will shear an individual retainer ring from the stack 236 for injection into the ring compressing assembly 210 thereabove through an access slot 245 therein which is in vertical alignment with and the injector plate 226. As the retainer ring 200 is moved upwardly by the injector plate 226, it cams the pencil point nose 338a of the lever 338 to the left (in FIG. 15) out of the way against bias of springs 241 and eventually is placed on the necked-down end 286 of the mandrel 264. Once the retainer ring passes the guide lever 338, the guide lever closes by bias of springs 241 to maintain the retainer ring in position thereabove.

Injector plate 226 is fastened to support plate 228 which in turn is fastened to L-shaped bracket 228a. Bracket 228a is connected through a suitable coupling 229 to the shaft 230 of hydraulic cylinder 232 mounted on horizontal base plate 219 fastened to frame or base 218. Cylinder 232 is of course actuated to move injector plate 226 up and down relative to the stack 236 of retainer rings 200 and the compressing assembly 210 when the latter is positioned at position P1 by first slide 211.

The ring compressing assembly 210 (when positioned at ring load position P1) is mounted above the injector plate 226 to align the guide slot 245 therein to receive an individual retainer ring sheared from the stack 236 by the injector plate 226 during its upward movement. The ring compressing assembly 210 includes base members 260,261,263 on which are mounted a compression barrel assembly 262 and mandrel 264. Base members 260,261,263 are mounted on the first slide 211 for movement therewith.

Referring primarily to FIGS. 13-15 and 20, the barrel assembly 262 comprises a top barrel half 270 and a bottom barrel half 272, both of which are held on base plate 260 by saddle block 274 fastened to base plate 260. The bottom barrel half 272 includes the access slot 245 for entry of an individual retainer ring that is injected by injector plate 226. The tapered, reduced (necked-down) mandrel end 286 functions as a guide portion of the mandrel 264 in front of the compression barrel assembly 262 to align the retainer ring lugs 206a,208a in the up position with respect to a mandrel lug-engaging means shown as an elongated keyway or slot 288 extending along the length of the mandrel 264 toward the assembly location L.

It is apparent that the top and bottom barrel halves 270,272 define a bore 298 therethrough with a first cylindrical inlet portion 298a of a sufficient diameter to receive the uncompressed retainer ring 200, and intermediate tapered portion 298b having a gradually decreasing diameter toward the assembly location L and a second cylindrical outlet portion 298c with a smaller diameter corresponding to the outlet diameter of the intermediate section 298b. The lug-retaining keyway 288 of the mandrel 264 is initially converging, FIG. 17, along the length thereof disposed in the first bore portion 298a and terminates into a narrow, constant width section along the length thereof disposed in the tapered bore portion 298b. The keyway 288, as shown, extends through bore portions 298b and 298c and out of the barrel assembly and terminates at the outboard end 246a of the mandrel, the end 288a of the keyway constituting an expansion portion of the mandrel to be described in more detail hereinbelow.

The mandrel 264 is supported inside the compression barrel member 296 by means of a mandrel support extension 308 fastened on base plate 263 by screws 309.

A retainer ring moving means 320 (pusher means) is mounted on a second, horizontal slide 322 that is slidably disposed on the same (or optionally different) slideway 213 as the first slide 211. The second slide 322 is connected to the first slide 211 by the plunger or piston 326 of a second actuator (e.g., a fluid cylinder) 328 fixedly carried on the second slide 322. The piston 326 is connected to the first slide 211 via a coupling 330 and block 331 affixed on the first slide 211 as shown best in FIG. 15.

The ring pusher means 320 comprises three angular spaced pusher rails 340,342,344 that are attached (by integral caps 341 and screws 343) to a support block 345 which is attached on the second slide 322 by machine screws 347,349 and intermediate support plates 348,350. The three pusher rails 340,342,344 have outer arcuate surfaces and inner flat surfaces and initially (before a ring is inserted) extend into the inlet portion 298a of the compression barrel 296 as shown but short of or behind the slot 245 through which the retainer ring 200 is injected into the inlet portion 298a. The pusher rails 340,342,344 are caused to move toward or away from the compression barrel 296 by actuation of the fluid cylinder 328 when the ring compressing assembly 210 is positioned at the assembly position P2, as will be explained.

In operation, the actuator 215 is energized to move the first slide 211 and the second slide 322 operably coupled thereto (via piston 326) in unison to the left (in FIG. 15) to position the ring compressing assembly 210 at the ring load position P1. The position of actuator 328 when the compressing assembly 210 is so positioned (at P1) is shown in phantom in FIG. 13. An individual retainer ring is then sheared from the ring stack 236 by upward movement of injector plate 226 which pushes the ring through access slot 245 in the barrel assembly 398 and onto the reduced end 286 of the mandrel 264 in front of the pusher rails 340,342,344 with the retainer ring lugs 206a,208a oriented up, FIG. 20. The actuator 215 is then energized to move the first slide 211 and second slide 32 in unison to the right in FIG. 15 to position the compressing assembly 210 at position P2. The ring pusher means 320 is positioned as shown in solid in FIG. 15. The pusher rails 340,342,344 are then moved to the right in FIG. 15 by actuator 328. The pusher rails 340,342,344 move between the mandrel 264 and the barrel assembly 262 so as to engage the retainer ring 200 positioned on reduced mandrel end 286 and push it through the compression barrel member 296 during which the ring is compressed to assembly size with the lugs 206,208 being compressed into and interiorly retained in keyway 288 with the lug outer sides 206a,208a engaged against the opposing sides of the keyway 288 and the lug inner sides 206b,208b touching in the keyway 288. The pusher rails 340,342,344 are angularly spaced apart to engage behind a respective one of the lugs 206,208,209 to push the ring through the compression barrel assembly 296. The outer arcuate surfaces of the pusher rails 340,342,344 define collectively an outer diameter less than the minimum diameter of the compressing bore 298 so that the pusher rails are not compressed as they move through the ring compressing assembly 210; i.e., the angular spacing between the pusher rails remains substantially constant. As the pusher rails 340,342,344 move through the ring compressing assembly 210, they gradually engage a greater area of the lugs 206,208,209 by virtue of the retainer ring being compressed in size.

The mandrel 264 includes recessed flats 264a to accommodate the rails 340,342,344 as they push the ring through the compression barrel assembly 298 to the assembly location L.

The ring is thus compressed to assembly size on the mandrel 264 which has a diameter selected to this end and is retained thereon by virtue of the lugs 206,208 being retained in the keyway 288 as shown in FIG. 14. The ring 200 in the compressed condition has a circular outer profile in plan and circular inner profile in plan with the latter (i.e., center of inner profile) offset slightly from the center of the outer circular profile. The ring in this compressed condition is pushed along the mandrel 264 through bore 298 and out the other side of the barrel assembly to the mandrel end 246a where the compressed-to-size retainer ring is stripped by the pusher rails' 340,342,344 moving the ring past the keyway end 288a where the ring expands in size in the bore B of the piston P to retain the wrist pin W therein.

During actuation of actuator 238 to move the second slide 322 relative to and toward the first slide 211 after the ring compressing assembly 210 is positioned at position P2, the first slide 211 is prevented from lateral movement by abutting stationary base wall 361 on one side thereof and the second slide 322 on the other side thereof. In particular, the second slide 322 is caused (by actuator 328) to move toward the first slide 211 to engage or abut the adjustment screw 350 on the first slide 211 (e.g., see phantom position of slide 322 in FIG. 13) to trap the first slide between the base wall 361 and the second slide 322 at the assembly position P2 and thus prevent movement thereof as the retainer ring is pushed through the ring compressing assembly 210 into the bore B of the piston by pusher rails 340,342,344. The actuator 238 may optionally include a stop (not shown) to this same end.

However, prior to insertion of the ring 200 in the bore B of the piston P, the piston bore B is centered relative to the mandrel 264 by opposing, angled centering walls or surfaces 360,362 formed on cantilevered plates 364,366 that are attached to base plate 261. The centering surfaces 360,362 are advanced past and relative to the outer opposite diametral sides of the piston P as the compressing means is moved to the assembly position P2 and locate on these outer diametral opposite sides thereof to center the bore B relative to the mandrel 264. Since the piston P is typically carried (but not fixtured in position) on a pallet PL. The piston P "floats" in position on the pallet PL and thus is amenable for centering by the centering surfaces 360,362. Centering is required for one type of piston P where the bore B and wrist pin W are slightly off center. The cantilevered plates 364,366 may optionally include inclined ramps 364a,366a for lifting or picking the piston P up off the pallet PL on which the piston is positioned but not fixtured. The important feature is to have the centering surfaces 360,362 or other centering means on the ring compressing assembly 210 to center the bore B relative to the mandrel 264.

The pallet PL typically includes a fixture FC for retaining the connecting rod C in position as a retainer ring is inserted therein in the piston bore B.

Thus, as the compressing means 210 is moved to position P2, the piston bore B is centered relative to the mandrel 264 so that the mandrel end 246a can enter the bore and the retainer ring 200 can be released and expand into bore B. The piston P may be supported (by block 367) against lateral (horizontal) movement during insertion of the mandrel 264 and the retainer ring 200 therein by suitable lateral support or fixturing means.

After the retainer ring 200 is inserted in the bore B of the piston P, the second slide 322 is moved by actuator 328 to the solid position to the left in FIG. 15 to withdraw the pusher rails 340,342,344 to a position behind (to the left) of the access slot 245 of the ring compressing assembly 210 and then the actuator 215 is actuated to move the first slide 211 and thus the second slide 322 operably coupled thereto in unison to the left to position the ring compressing assembly 210 at ring load position P1 to receive another retainer ring 200 for insertion in a succeeding piston P or the same piston P after it is rotated 180° to present the opposite side of the bore B for insertion of another retainer ring therein. Then, the above-mentioned sequence is repeated to insert the newly received retainer ring.

Although certain preferred features and embodiments of the invention have been described hereinabove and in the drawings, it is to be understood that modifications and changes may be made therein without departing from the spirit and scope of the invention as defined in the appended claims.

I claim:

1. A method of positioning a retainer ring on an article, comprising:
   (a) mounting a ring compressing assembly on a first slide,
   (b) mounting a ring pusher member on a second slide for movement relative to said first slide,
   (c) interconnecting the first slide and second slide with an actuator,
   (d) moving the first slide and interconnected second slide in unison thereby positioning the ring compressing assembly at a ring load position to receive an uncompressed ring,
   (e) moving the first slide and second slide in unison thereby positioning the ring compressing assembly at an assembly position adjacent the article, and
   (f) moving the second slide relative to the first slide at the assembly position by actuating the actuator so that the ring pusher member pushes the uncompressed retainer ring along the ring compressing assembly thereby compressing to compress the retainer ring to assembly size and then to assemble the compressed ring onto the article.

2. The method of claim 1 further including in step (f) holding said first slide stationary while moving said second slide toward said first slide.

3. The method of claim 2 wherein the first slide engages against a stop to hold said first slide stationary.

4. The method of claim 1 including in step (e) inserting a mandrel of the ring compressing assembly in a bore of the article.

5. The method of claim 1 including in step (e) engaging a centering mechanism on the ring compressing assembly with the article as the ring compressing assembly is positioned at the assembly position thereby substantially centering the bore of the article and the mandrel.

6. The method of claim 1 including in step (f) moving the second slide toward the first slide.

7. The method of claim 6 including an additional step, after step (f), of moving the second slide away from the first slide by actuating the actuator thereby returning the ring pusher member to an original position thereof in step (e).

8. The method of claim 7 including the further additional step of moving the first slide and the second slide in unison to position the ring compressing assembly at the ring load position to receive another uncompressed retainer ring.

* * * * *

UNITED STATES PATENT AND TRADEMARK OFFICE
CERTIFICATE OF CORRECTION

PATENT NO.   : 5,072,505
DATED        : December 17, 1991
INVENTOR(S)  : Deryll Liechty It is certified that error appears in the above-indentified patent and that said Letters Patent is hereby corrected as shown below:

```
Column 7, line 33, delete "13" and insert --131-- therefor;
Column 9, line 22, delete "and";
Column 11, line 66, delete ". The" and insert --, the--
                    therefor.
```

In the Claims:

Column 12, line 63, delete "to compress."

Signed and Sealed this

Thirteenth Day of July, 1993

Attest:

MICHAEL K. KIRK

Attesting Officer

Acting Commissioner of Patents and Trademarks